United States Patent
Boulton (10) Patent No.: US 11,321,451 B2
(45) Date of Patent: May 3, 2022

(54) METHOD AND SYSTEM FOR DETECTION OF POST COMPILATION MODIFICATION OF BINARY IMAGES

(71) Applicant: BlackBerry Limited, Waterloo (CA)

(72) Inventor: Adam John Boulton, Wirral (GB)

(73) Assignee: BlackBerry Limited, Waterloo, CA (US)

( * ) Notice: Subject to any disclaimer, the term of this patent is extended or adjusted under 35 U.S.C. 154(b) by 259 days.

(21) Appl. No.: 16/412,998

(22) Filed: May 15, 2019

(65) Prior Publication Data

US 2020/0364329 A1  Nov. 19, 2020

(51) Int. Cl.
G06F 21/00 (2013.01)
G06F 21/52 (2013.01)
G06F 21/57 (2013.01)

(52) U.S. Cl.
CPC ............ G06F 21/52 (2013.01); G06F 21/577 (2013.01); *G06F 2221/033* (2013.01)

(58) Field of Classification Search
CPC ... G06F 21/52; G06F 21/577; G06F 2221/033
See application file for complete search history.

(56) References Cited

U.S. PATENT DOCUMENTS

| | | | |
|---|---|---|---|
| 7,178,132 B2* | 2/2007 | Pierce | G06F 9/4486 717/127 |
| 9,607,152 B1* | 3/2017 | Kane | G06F 21/566 |
| 9,973,531 B1* | 5/2018 | Thioux | G06F 9/45558 |
| 2009/0187992 A1 | 7/2009 | Poston | |
| 2017/0024221 A1* | 1/2017 | He | G06F 8/65 |
| 2018/0293072 A1* | 10/2018 | Jhi | G06F 21/563 |
| 2018/0324219 A1* | 11/2018 | Xie | H04L 63/0209 |

FOREIGN PATENT DOCUMENTS

WO   2020070031 A1   4/2020

OTHER PUBLICATIONS

European Patent Office, Extended European Search Report on Application No. 20171215.5 dated Sep. 25, 2020.
Anonymous: "Automatic removal of junk instructions through state tracking", May 18, 2018, XP055729937, retrieved from https://www.usualsuspect.re/article/automatic-removal-of-junk-instructions-through-state-tracking.

* cited by examiner

*Primary Examiner* — Ghazal B Shehni
(74) *Attorney, Agent, or Firm* — Moffat & Co (57) ABSTRACT

A method at a computing device for identification post compilation manipulation of a binary image, the method including assessing the binary image for at least one junk instruction set; determining that the at least one junk instruction set is found within the binary image; and flagging the binary image as being manipulated based on the determining.

15 Claims, 5 Drawing Sheets

METHOD AND SYSTEM FOR DETECTION OF POST COMPILATION MODIFICATION OF BINARY IMAGES

FIELD OF THE DISCLOSURE

The present disclosure relates to analyzing binary software components, and in particular relates to determining whether binary software components have been modified post compilation.

BACKGROUND

Binary modification is performed in order to introduce a desired change in application behavior. There are many reasons why someone may change the binary image after compilation. These include fixing a quality issue in some cases. However, the reasons may be more nefarious, such as bypassing licensing mechanisms or introducing faults or viruses.

Binary static analysis involves examination of a compiled or binary representation of a software program and inferring various functionalities or characteristics without actually executing the program.

BRIEF DESCRIPTION OF THE DRAWINGS

The present disclosure will be better understood with reference to the drawings, in which.

DETAILED DESCRIPTION OF THE DRAWINGS

The present disclosure provides a method at a computing device for identification post compilation manipulation of a binary image, the method comprising: assessing the binary image for at least one junk instruction set; determining that the at least one junk instruction set is found within the binary image; and flagging the binary image as being manipulated based on the determining.

The present disclosure further provides a computing device for identifying post compilation manipulation of a binary image, the computing device comprising: a processor; and a communications subsystem, wherein the computing device is configured to: assess the binary image for at least one junk instruction set; determine that the at least one junk instruction set is found within the binary image; and flag the binary image as being manipulated based on the determining.

The present disclosure further provides a computer readable medium for storing instruction code which, when executed by a processor of a computing device configured for identifying post compilation manipulation of a binary image, cause the computing device to: assess the binary image for at least one junk instruction set; determine that the at least one junk instruction set is found within the binary image; and flag the binary image as being manipulated based on the determining.

Binary modification may be done post compilation on a binary image for various reasons, whether legitimate or nefarious. Binary modification is typically performed because access to source code is not available to the person making the modifications, and hence direct changes are made to the binary image.

Various techniques may be utilized to change a binary image. For example, common instructions may be used to modify an application behavior. One such common instruction involves the use of no-operation (NOP) instructions to patch out certain behavior. In particular, a plurality of NOP instructions may be written over legitimate code to avoid the behavior of the legitimate code. For example, this technique is commonly used for bypassing security or licensing mechanisms. Such plurality of NOP instructions are basically junk instructions that do nothing. Real world simulations have found that four or more consecutive NOP instructions are an indicator that the binary image has been manipulated post compilation.

In other cases, junk instructions may include Exclusive Or (XOR) opset that, when plotted using binary analysis, do nothing. Again, these junk instructions may be substituted for legitimate code to bypass or avoid such legitimate code.

In other cases, memory manipulation by pushing and popping repeatedly to a memory location may also be considered to be junk instructions since these repeated memory calls do not affect the operation of the software program.

In other cases, junk instructions may be more complex. A routine may be added that, when simulated, achieves nothing. Such junk instructions may look legitimate, but may wind themselves back in the end so that the code achieves nothing.

A compiler will generally not create such junk instructions. A compiler typically sets out to achieve optimal sequences in order to achieve efficiencies. In this regard, NOP instructions are generally only used for memory alignment purposes when found in compiled binary code. A defined plurality of NOP instructions (such as four or more) are generally not found together within legitimate compiled code.

Similarly, other junk instruction sequences that tend to do nothing in the code would not be added by a compiler.

In this regard, the present disclosure provides for methods and systems to analyze binary code and determine whether manipulation of the code has occurred post compilation. Such manipulation of the code may indicate that the code is not genuine and may create risk factors for the execution of such code within a system.

In some cases, a library of junk instruction sets may be created and stored to enable future static binary analysis of the compiled code. For example, some junk instructions may include a complex payload which may need to be simulated and the state of a stack at the beginning and end of execution may be tracked to determine whether any changes have occurred. When such junk instruction sets are found, the junk instruction set can be added to a database or library for future static binary analysis. Using such library of junk instructions, static analysis may then more readily find manipulation of binary images.

Therefore, in accordance with embodiments of the present disclosure, a rules-based determination of what may be junk instructions as well as a comparison to what is in the library may be made. Over time, the library will be trained on more and more data and will be more and more effective at finding and flagging code that has been altered after compilation. Specifically, as the library is built over time, analysis of the library allows identification of different patterns, and this means that the rules-based questions can be improved over time.

If post compilation manipulation of binary code is found, a risk factor may in some cases it be applied to the binary code. The risk factor may be weighted depending on the purpose of the software or binary code. For example, system critical code which may cause system failures, risk injury to individuals, or expose critical components to viruses may not allow the use of software that has been manipulated post compilation. In other cases, the software may be analyzed to determine a level of risk introduced by the post compilation manipulation and a value for the risk level may be assigned to the software. This value may then be compared with a threshold value for running the software on the system. How a level of risk is determined depends on the context of the code and has many data points that can be assessed, i.e. safety critical systems, origins of code etc. For example, calculation of risk is described in U.S. patent application Ser. No. 16/370,738, "DETERMINING SECURITY RISKS IN BINARY SOFTWARE CODE", filed Mar. 29, 2019 and in U.S. patent application Ser. No. 16/200,409, "DETERMINING SECURITY RISKS IN SOFTWARE CODE", filed Nov. 26, 2018, the contents of both of which are incorporated herein by reference. However, how the level of risk is determined is beyond the scope of the present disclosure. Rather, the present disclosure flags code that has been altered and a provides such flags to a bigger system that takes that flag and the context data and determines the risk and thresholds.

The analysis of a binary image can be done for any component or system.

In the present disclosure, the binary images being analyzed relate to an automotive environment. However, this is provided merely for illustration and the present disclosure could equally be used with any software system or binary image, regardless of the purpose of the software system or binary image.

Using the example of an automotive system, a modern vehicle may have over 100 million lines of software code. As software in a vehicle grows, so does a potential for critical errors or faults, which can lead to systems failing, or may lead to a large attack surface, which makes such software vulnerable to attacks. Post compilation manipulation of the software may indicate a vulnerability in such software, and may need to be analyzed in more detail and potentially barred from running on the system. The analysis can occur, for example, during production of the vehicle, when a new component is added, during a debug build, post production, during system testing, or at any time the code is compiled, among other options.

Methods and systems are provided herein which may analyze software within a system to detect post compilation manipulation within the software. For example, static analysis may be performed on the binary code within a system. Through binary static analysis, a range of junk instructions can be looked for within the binary image and flagged if found. Further, simulation of parts of the software may indicate whether or not the part of the software is a junk instruction. If junk instructions are found, a library of the junk instructions can be updated to include the junk instructions to ensure that future static analysis of binary images captures a wider range of junk instruction sets. As used herein, a software image comprises binary code which was compiled from source code, and is thus not readily readable by a person.

Binary static analysis allows binary software components to be analyzed without referring to the high-level source code from which the binary software component was compiled. Binary static analysis is performed by examining the content and structure of the binary data making up the binary software component. Using these techniques, characteristics of the binary software component can be identified, including, but not limited to, functions defined in the program, application programming interfaces (APIs) used by the program, compiler defensive techniques implemented in the functions defined in the program, post compilation manipulation, and other characteristics of the binary software component. Due to the general unavailability of corresponding high-level source code to users of binary software components, analyzing the complexity of a binary software component using binary static analysis would allow users to more easily evaluate the likelihood of bugs, failures, and logic errors occurring during execution of the binary software component.

Binary software components are binary files including instructions to be executed by a processor. A binary software component may be generated from a set of source code by a compiler program, which translates the source code into instructions specific to a particular processor (e.g., INTEL CORE 17) or processor architecture (e.g., ARM). The binary software component may include a number of code blocks that equate roughly to functions defined in source code.

Generally, file formats used to encode binary software components (e.g., Executable and Linkable Format (ELF)) indicate areas of the file where executable code resides, but they do not indicate the locations of individual functions and data. In some cases, it may be possible to identify functions by using a symbol table encoded in the file. This table, however, may not contain references to all functions and in some cases may not be included in the file. A map identifying the start and end locations of functions, as well as data components for the function, may be used to perform a binary static analysis on the binary software component.

In addition, binary software components compiled for some processor architectures (e.g., ARM) may contain a mixture of instruction sets. For example, a binary software component compiled for the ARM architecture may include instructions from the ARM 32-bit instruction set, as well as instructions from the THUMB 16-bit instruction set. In some cases, a binary software component may not include any indication regarding which code blocks use which instruction set.

In other cases, binary static analysis may involve examining a binary software component for other vulnerabilities. For example, code within the software can be analyzed to determine whether such code would be generated by a compiler. As described above, junk instructions such as a plurality of NOP instructions, memory manipulation using push and pop repeatedly, XOR instructions that do nothing, or more complex routines that wind back the stack to the original state, are among options or characteristics for junk instructions.

In still further cases, other vulnerabilities may be considered during a binary static analysis, and the present disclosure is not limited to any particular analysis performed during a binary static analysis.

Figure 1:
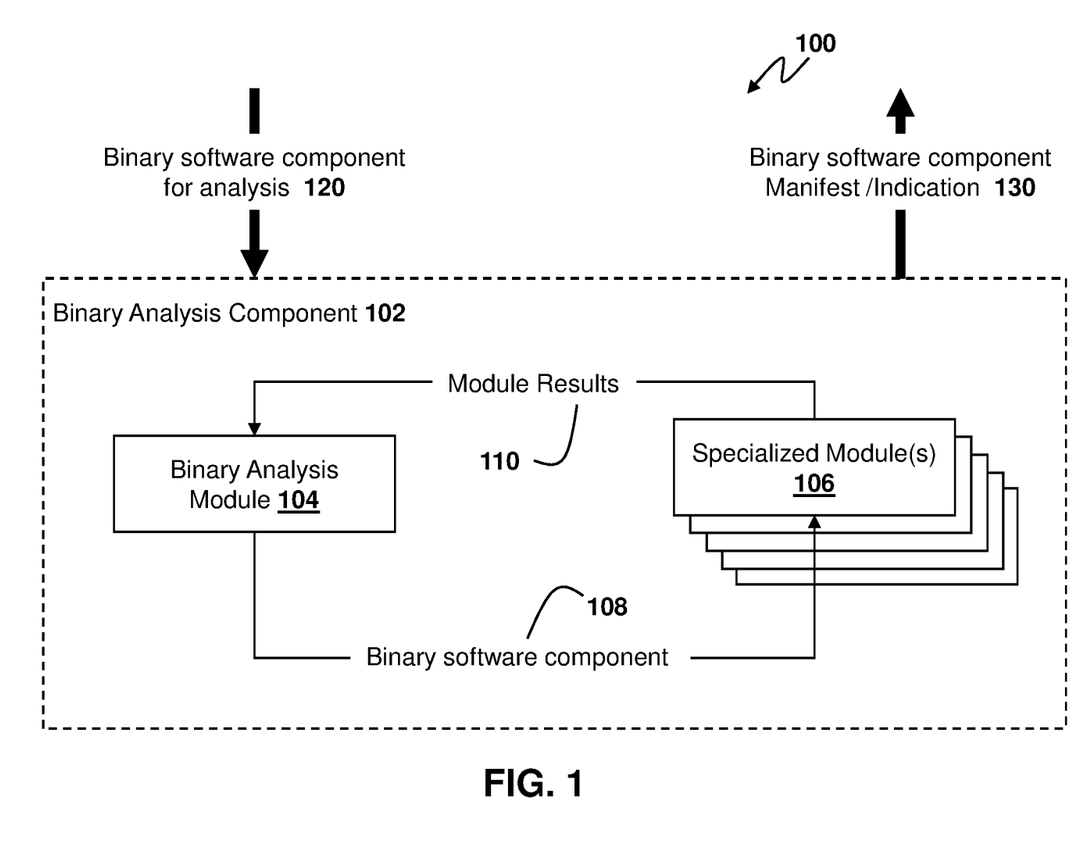
FIG. 1 is a block diagram of a system for performing static analysis of a binary image.

FIG. 1 provides additional details for the performance of a binary static analysis. FIG. 1 is a schematic diagram showing a system 100 that identifies different characteristics or vulnerabilities within a binary software component using binary static analysis, according to one embodiment. The system 100 includes a binary analysis component 102, which can include a binary analysis module 104 and one or more specialized modules 106. The binary analysis component 102 can include a system for performing binary static analysis on software components to generate a manifest or indication 130 including characteristics or potential vulnerabilities of the binary software component determined during the analysis. The binary analysis component 102 can include one or more computing devices executing software programs, such as the binary analysis module 104 and the one or more specialized modules 106, to perform portions of the analysis of software components.

For example, specialized modules 106 may include one or more of, but are not limited to, a stack cookie detector to detect whether cookies are being placed on a stack; a binary mapper module to map the various binary components to a particular processor or instruction set; a complexity analysis module to determine complexity characteristics within the binary code; a message ID filter identification module to find message identifiers that a node will accept, a confidence module for finding how robust the software component is, a post compilation manipulation detector to detect whether the binary image has been changed after compilation, among other options.

In an example operation, the binary analysis component 102 can receive a binary software component 120 for analysis. The source of the binary software component can be, for example, a software build environment, a software deployment manager, or an executable file (not shown). The binary analysis module 104 of the binary analysis component 102 can perform binary static analysis on the binary software component. In some cases, the binary analysis module 104 performs this analysis utilizing module results 110 generated by the one or more specialized modules 106. The binary analysis module may provide the binary software component (or a reference to it) to the one or more specialized modules 106, as for example shown with binary software component 108. The one or more specialized modules 106 may perform various functionality based on the type of module and the purpose of the module.

In some implementations, the module results 110 may include information about program sections (e.g., functions, data structures) included in the binary software component, including, but not limited to, an instruction set utilized by the program section, a starting location of the program section within the binary software component, an ending location of the program section within the binary software component, or other information. The binary analysis module 104 may use the module results 110 to perform the binary static analysis of the binary software component. For example, the binary analysis module 104 may iterate through each program section in a software map, and begin its analysis at the specified starting location within the binary software component. The binary analysis module 104 may also use the instruction set specified for the function in the module results 110 to disassemble the instructions for each program section during its analysis of the binary software component.

In one case, the specialized modules 106 may include a module used to identify post compilation manipulation of a software component within the binary image for a computing node such as an ECU within a vehicle. In particular, the post compilation manipulation module may check for junk instructions utilizing a library. Further, in some cases the module may simulate certain sections of the binary code to determine whether the code comprises junk instructions. If junk instructions are found during such simulation, the library may be updated to produce a more comprehensive library of junk instruction sets for future checking.

Figure 2:
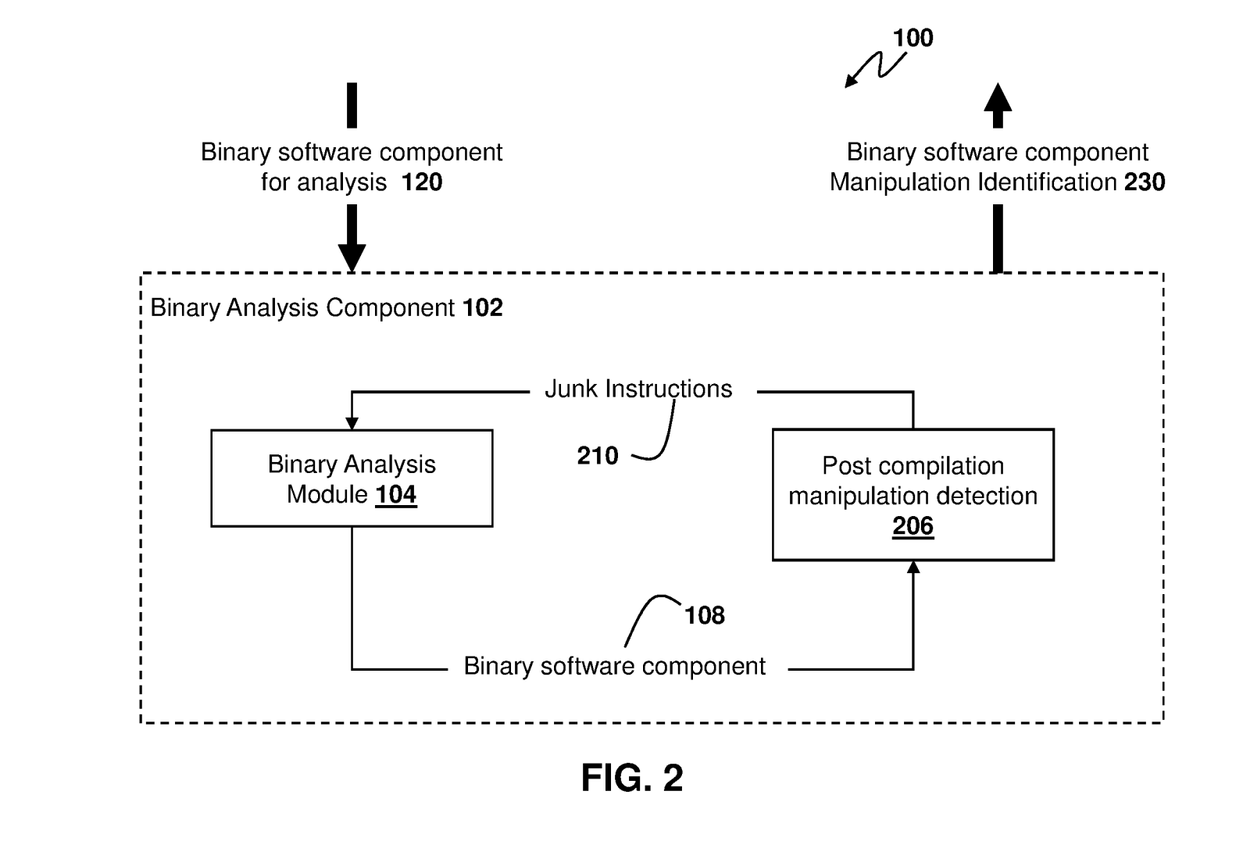
FIG. 2 is block diagram of system for finding message identifier filters within a binary image.

Reference is now made to FIG. 2, which shows a post compilation manipulation detection module 206 as being part of the binary analysis component 102. Similar reference numerals to those provided above with regard to FIG. 1 are used in FIG. 2 for similar elements.

In particular, for each software module, the binary analysis component 102 may receive a binary software component for analysis, shown with reference numeral 120.

The binary analysis component 102 utilizes a binary analysis module 104 which may send the binary software component 108 to post compilation manipulation detection module 206. The post compilation manipulation detection module 206 may then provide identification of junk instructions within that binary software component 108 to binary analysis module 104, shown with message 210. The binary analysis module 104 may then provide identification that the software has been manipulated. In some cases the identification may be provided to a system or server that may review the manipulation, purpose of the software component, and other context for the software component, and such system or server may in some cases assign a risk score. However, as indicated above, the assigning of a risk score is beyond the scope of the present disclosure.

Once the software component has been analyzed, the process may return the binary software component manipulation identification 230.

Finding Manipulation of the Binary Images

In accordance with one embodiment of the present disclosure, a binary image of a software component may be analyzed to determine whether "junk instructions" exist within the binary software component, providing an indication that the software has been manipulated post compilation.

Figure 3:
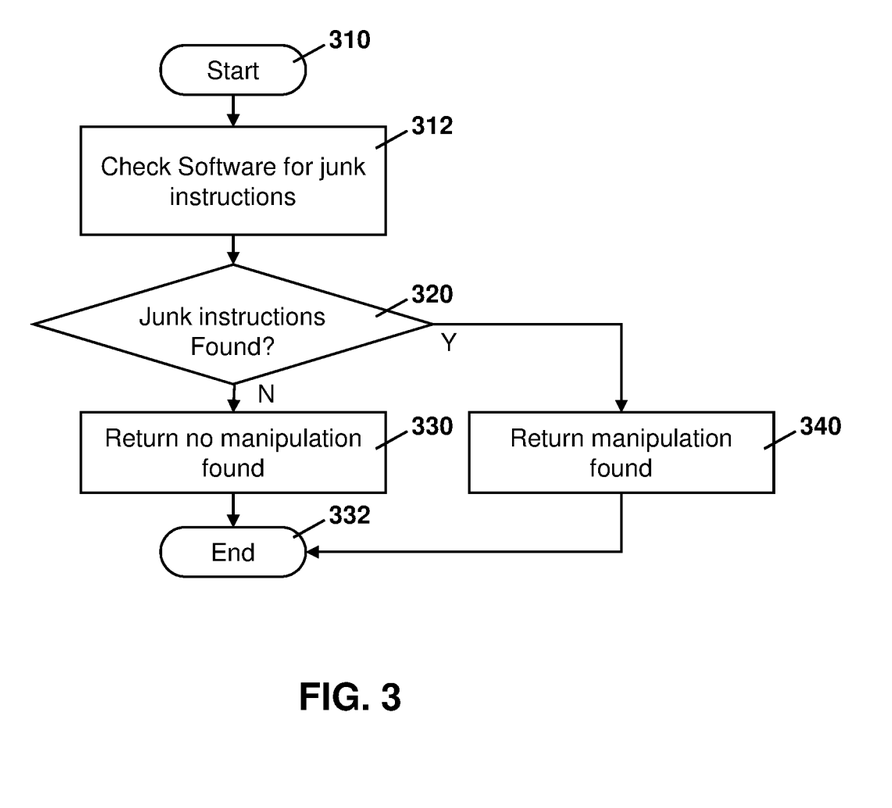
FIG. 3 is a process diagram showing the finding of manipulation of a binary image or binary software component.

In this regard, reference is now made to FIG. 3. FIG. 3 shows a process for finding whether manipulation has occurred after compiling the source code has taken place.

In particular, the process of FIG. 3 starts at block 310 and proceeds to block 312 in which the software image may be checked for junk instructions. The process of block 312 may for example, refer to a library having various examples of junk instructions which may be found within a piece of software. In other cases, the check at block 312 may have certain types of junk instructions hardcoded. For example, a check may be made to find the multiple consecutive NOP instructions. In other cases, a check may be made to find redundant memory operations, or routines in which the stack does not change, among other options.

From block 312, the process proceeds to block 320 in which a check is made to determine whether any junk instructions were found through the check at block 312. If not, the process proceeds to block 330 in which the process may return that no manipulation has been found. The process may then proceed to block 332 and end.

Conversely, if junk instructions are found at block 320, the process may proceed to block 340 in which details about the manipulation may be provided. For example, the message at block 340 may be message 210 from FIG. 2. Details of the manipulation may include the type of manipulation found, which routine the manipulation is found in, the amount of code that was found to have been manipulated, among other information.

The process may then proceed from block 340 to block 332 and end.

Figure 4:
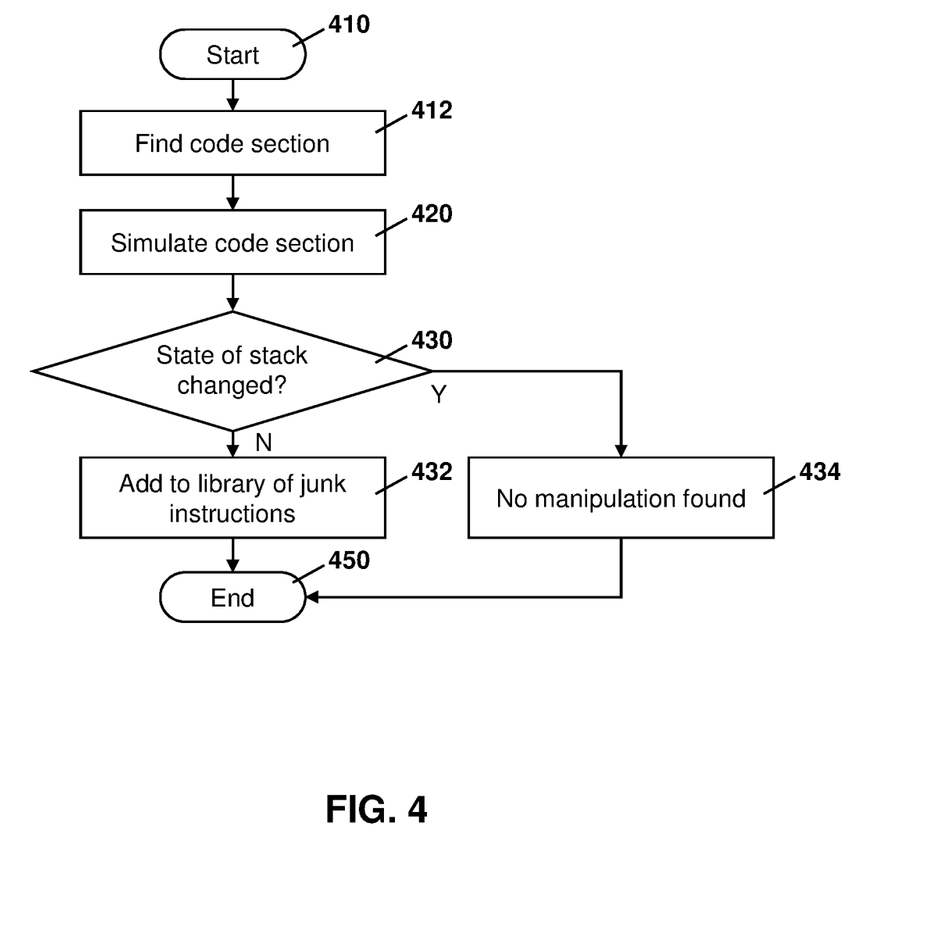
FIG. 4 is a process diagram showing simulation of binary code segments to determine whether the segment comprises junk instructions, and populating a library, if junk instruction sets are found.

Further, while the embodiment of FIG. 3 finds whether software has been manipulated, in some cases the software or parts of the software may need to be simulated in order to determine whether junk instructions are present. These junk instructions can then be added to a library of junk instructions for future binary static analysis. Reference is now made to FIG. 4.

In the embodiment of FIG. 4, the process starts at block 410 and proceeds to block 412 in which a code section to be analyzed may be found. The finding of the code section may be done in various ways. Certain flags or indicators may be indicative of a code section which may have been manipulated after compilation. These flags or indicators may cause the code to be flagged or to be further analyzed at block 412. In other cases, a random sampling of the code may be selected for code analysis.

In still further cases, sections of the code which may be vulnerable such as those checking for licensing, security, or those which may require higher security could be checked and selected at block 412.

From block 412, the process proceeds to block 420 in which the code section may be simulated. The simulation may run the code segment and monitor the stack of the process to determine the outcome. In particular, more complex junk instruction sets may do nothing, but this may be hard to detect. However, if the stack state at the end of the process is the same as that at the beginning the process, this may indicate that the code consists of junk instructions.

From block 420, the process proceeds to block 430 in which a check of the stack state is made. In particular, the check at block 430 could determine whether the stack has changed or remains the same from the beginning of the code section to the end of the code section (or for parts of the code section).

If a change in the stack state has been detected, the code section is likely performing some valid action and therefore no manipulation is found, as shown at block 434.

Conversely, if the stack state has not changed, this may be indicative of a junk instruction code section, and the process then proceeds to block 432. At block 432, the code segment is added to the library of junk instructions which may be then used in the embodiment of FIG. 3, for example.

From block 432 or block 434, the process proceeds to block 450 and ends.

While the examples above are provided for vehicle systems, the analysis of software robustness can be done in any system. For example, the analysis may be performed on medical equipment, Internet of things devices, applications within an application store such as the Google™ Play Store™ or the Apple™ App Store™, among other options.

A server performing the analysis from FIGS. 1 to 4 may be any computing device, network node or element, or may be a combination of computing devices, network nodes or elements. For example, one simplified server that may perform the embodiments described above is provided with regards to FIG. 5.

Figure 5:
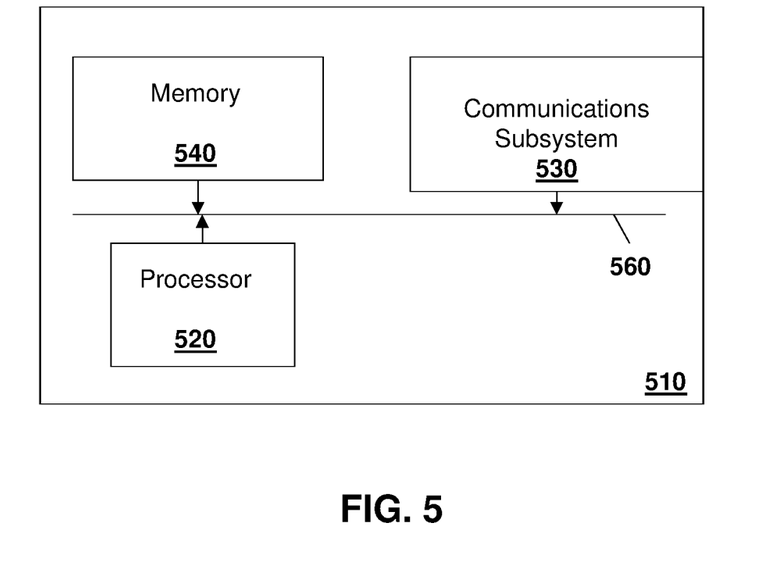
FIG. 5 is a block diagram of an example computing device or server capable of being used with the embodiments of the present disclosure.

In FIG. 5, server 510 includes a processor 520 and a communications subsystem 530, where the processor 520 and communications subsystem 530 cooperate to perform the methods of the embodiments described herein.

The processor 520 is configured to execute programmable logic, which may be stored, along with data, on the server 510, and is shown in the example of FIG. 5 as memory 540. The memory 540 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 520 may also be implemented entirely in hardware and not require any stored program to execute logic functions.

Alternatively, or in addition to the memory 540, the server 510 may access data or programmable logic from an external storage medium, for example through the communications subsystem 530.

The communications subsystem 530 allows the server 510 to communicate with other devices or network elements.

Communications between the various elements of the server 510 may be through an internal bus 560 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In particular, the present disclosure may include the embodiments of the following clauses:

AA. A method at a computing device for identification post compilation manipulation of a binary image, the method comprising: assessing the binary image for at least one junk instruction set; determining that the at least one junk instruction set is found within the binary image; and flagging the binary image as being manipulated based on the determining.

BB. The method of clause AA, wherein the at least one junk instruction set is from a library of junk instruction sets.

CC. The method of clause BB, wherein the library is updated by: simulating a code section from at least one binary image; finding that a stack state has not changed from a beginning of the simulating to an end of the simulating; and adding the code section as a junk instruction within the library.

DD. The method of any one of clauses AA to CC, wherein the junk instruction set is a defined plurality of consecutive no-operation instructions.

EE. The method of any one of clauses AA to DD, wherein the junk instruction set is a plurality of memory push and pops.

FF. The method of any one of clauses AA to EE, wherein the junk instruction set is an Exclusive Or opset performing no operation.

GG. The method of any one of clauses AA to FF, further comprising providing the flagged binary image to a risk assessment system.

HH. The method of any one of clauses AA to GG, wherein the flagging includes details of the manipulation.

II. The method of clause HH, wherein the details of the manipulation include one or more of: the type of manipulation found; which routine the manipulation was found in; and an amount of code that was found to have been manipulated.

JJ. A computing device for identifying post compilation manipulation of a binary image, the computing device comprising: a processor; and a communications subsystem, wherein the computing device is configured to: assess the binary image for at least one junk instruction set; determine that the at least one junk instruction set is found within the binary image; and flag the binary image as being manipulated based on the determining.

KK. The computing device of clause JJ, wherein the at least one junk instruction set is from a library of junk instruction sets.

LL. The computing device of clause KK, wherein the library is updated by: simulating a code section from at least one binary image; finding that a stack state has not changed from a beginning of the simulating to an end of the simulating; and adding the code section as a junk instruction within the library.

MM. The computing device of any one of clauses JJ to LL, wherein the junk instruction set is a defined plurality of consecutive no-operation instructions.

NN. The computing device of any one of clauses JJ to MM, wherein the junk instruction set is a plurality of memory push and pops.

OO. The computing device of any one of clauses JJ to NN, wherein the junk instruction set is an Exclusive Or opset performing no operation.

PP. The computing device of any one of clauses JJ to OO, wherein the computing device is further configured to provide the flagged binary image to a risk assessment system.

QQ. The computing device of any one of clauses JJ to PP, wherein the computing device is configured to flag by including details of the manipulation.

RR. The computing device of clause QQ, wherein the details of the manipulation include one or more of: the type of manipulation found; which routine the manipulation was found in; and an amount of code that was found to have been manipulated.

SS. A computer readable medium for storing instruction code which, when executed by a processor of a computing device configured for identifying post compilation manipulation of a binary image, cause the computing device to: assess the binary image for at least one junk instruction set; determine that the at least one junk instruction set is found within the binary image; and flag the binary image as being manipulated based on the determining.

TT. The computer readable medium of clause SS, wherein the at least one junk instruction set is from a library of junk instruction sets.

UU. The computer readable medium of clause TT, wherein the library is updated by: simulating a code section from at least one binary image; finding that a stack state has not changed from a beginning of the simulating to an end of the simulating; and adding the code section as a junk instruction within the library.

VV. The computer readable medium of any one of clauses SS to UU, wherein the junk instruction set is a defined plurality of consecutive no-operation instructions.

WW. The computer readable medium of any one of clauses SS to VV, wherein the junk instruction set is a plurality of memory push and pops.

XX. The computer readable medium of any one of clauses SS to WW, wherein the junk instruction set is an Exclusive Or opset performing no operation.

YY. The computer readable medium of any one of clauses SS to XX, wherein the instruction set further causes the computing device to provide the flagged binary image to a risk assessment system.

ZZ. The computer readable medium of any one of clauses SS to YY, wherein the instruction set further causes the computing device to flag by including details of the manipulation.

AAA. The computer readable medium of clause ZZ, wherein the details of the manipulation include one or more of: the type of manipulation found; which routine the manipulation was found in; and an amount of code that was found to have been manipulated.

The invention claimed is:

1. A method at a computing device for identification post compilation manipulation of a binary image, the method comprising:
   assessing the binary image for at least one junk instruction set wherein the at least one junk instruction set is from a library of junk instruction sets;
   determining that the at least one junk instruction set is found within the binary image; and
   flagging the binary image as being manipulated based on the determining;
wherein the library is updated by:
   simulating a code section from at least one binary image, wherein simulating the code section comprises:
   running the code section in a process; and
   monitoring a stack state of the process;
   finding that the stack state has not changed from a beginning of the simulating to an end of the simulating; and
   adding the code section as a junk instruction within the library.

2. The method of claim 1, wherein the junk instruction set is a defined plurality of consecutive no-operation instructions.

3. The method of claim 1, wherein the junk instruction set is a plurality of memory push and pops.

4. The method of claim 1, wherein the junk instruction set is an Exclusive Or opset performing no operation.

5. The method of claim 1, further comprising providing the flagged binary image to a risk assessment system.

6. The method of claim 1, wherein the flagging includes details of the manipulation.

7. The method of claim 6, wherein the details of the manipulation include one or more of: the type of manipulation found; which routine the manipulation was found in; and an amount of code that was found to have been manipulated.

8. A computing device for identifying post compilation manipulation of a binary image, the computing device comprising:
   a processor; and
   a communications subsystem,
wherein the computing device is configured to:
   assess the binary image for at least one junk instruction set wherein the at least one junk instruction set is from a library of junk instruction sets;
   determine that the at least one junk instruction set is found within the binary image; and
   flag the binary image as being manipulated based on the determining;
wherein the library is updated by:
   simulating a code section from at least one binary image, wherein simulating the code section comprises:
   running the code section in a process; and
   monitoring a stack state of the process;
   finding that the stack state has not changed from a beginning of the simulating to an end of the simulating; and
   adding the code section as a junk instruction within the library.

9. The computing device of claim 8, wherein the junk instruction set is a defined plurality of consecutive no-operation instructions.

10. The computing device of claim 8, wherein the junk instruction set is a plurality of memory push and pops.

11. The computing device of claim 8, wherein the junk instruction set is an Exclusive Or opset performing no operation.

12. The computing device of claim 8, wherein the computing device is further configured to provide the flagged binary image to a risk assessment system.

13. The computing device of claim 8, wherein the computing device is configured to flag by including details of the manipulation.

14. The computing device of claim 13, wherein the details of the manipulation include one or more of: the type of manipulation found; which routine the manipulation was found in; and an amount of code that was found to have been manipulated.

15. A non-transitory computer readable medium for storing instruction code which, when executed by a processor of a computing device configured for identifying post compilation manipulation of a binary image, cause the computing device to:
   assess the binary image for at least one junk instruction set wherein the at least one junk instruction set is from a library of junk instruction sets;
   determine that the at least one junk instruction set is found within the binary image; and
   flag the binary image as being manipulated based on the determining;
wherein the library is updated by:
   simulating a code section from at least one binary image, wherein simulating the code section comprises:
   running the code section in a process; and
   monitoring a stack state of the process;
   finding that the stack state has not changed from a beginning of the simulating to an end of the simulating; and
   adding the code section as a junk instruction within the library.

* * * * *

UNITED STATES PATENT AND TRADEMARK OFFICE
CERTIFICATE OF CORRECTION

| | |
|---|---|
| PATENT NO. | : 11,321,451 B2 |
| APPLICATION NO. | : 16/412998 |
| DATED | : May 3, 2022 |
| INVENTOR(S) | : Adam John Boulton |

It is certified that error appears in the above-identified patent and that said Letters Patent is hereby corrected as shown below:

On the Title Page

Delete "(73) Assignee: BlackBerry Limited, Waterloo, CA (US)" and insert -- (73) Assignee: BlackBerry Limited, Waterloo (CA) --

Signed and Sealed this
Fifth Day of July, 2022

Katherine Kelly Vidal
Director of the United States Patent and Trademark Office